United States Patent [19]

SooHoo et al.

[11] Patent Number: 4,830,495
[45] Date of Patent: May 16, 1989

[54] BALANCED DUAL SERVO VCO PASSIVE RING LASER GYROSCOPE

[75] Inventors: Kie L. SooHoo; James H. Doty, both of Anaheim, Calif.

[73] Assignee: Rockwell International Corporation, El Segundo, Calif.

[21] Appl. No.: 44,921

[22] Filed: May 1, 1987

[51] Int. Cl.$^4$ .............................................. G01B 9/02
[52] U.S. Cl. ................................................ 356/350
[58] Field of Search .......................... 356/350; 372/94

[56] References Cited

U.S. PATENT DOCUMENTS

| 4,135,822 | 1/1979 | Ezekiel | 356/350 |
| 4,429,573 | 2/1984 | Walker | 356/350 X |
| 4,673,293 | 6/1987 | Sanders | 356/350 |

FOREIGN PATENT DOCUMENTS 0216211 10/1985 Japan ................................. 356/350

OTHER PUBLICATIONS

S. Ezekiel and S. R. Balsamo, "Passive Ring Resonator Laser Gyroscope", *Applied Physics Letters*, vol. 30, No. 9, May 1, 1977, pp. 478-480.

Primary Examiner—Stephen C. Buczinski
Assistant Examiner—Linda J. Wallace
Attorney, Agent, or Firm—H. Fredrick Hamann; George A. Montanye; James F. Kirk

[57] ABSTRACT

A passive ring resonator gyroscope comprising a single piece body having an integral first and second resonator cavity. The first resonator cavity contains a single frequency laser means to provide a sharply tuned single frequency light source to the second resonator cavity. The single frequency light source is sharply tuned and is split to form first and second sources. The second resonator cavity is a passive high Q cavity having a closed second optical path. The two light sources are fed to the second resonator and propagate as CW and CCW beams within the second resonator. A first servo channel tunes the frequency of the CW beam to a resonance peak. A second servo channel tunes the CCW beam to its resonance peak. By converting both servo error outputs into frequency, the relative frequency difference between the CW and CCW beams are recorded as the frequency shift in response to the body rate rotation about the sensitive axis. The first and second control signals are algebraically added to provide a passive cavity path length difference servo signal which is integrated. A SECOND ADDER adds the integrated passive cavity difference signal to the reference signal (Fm) to provide the passive cavity path length servo signal to a passive cavity path length adjusting means for constantly adjusting the passive cavity path length servo signal to keep the passive cavity at peak resonance at a frequency substantially mid-range between the propagating (FCW) and the counterpropagating beams (FCCW).

9 Claims, 12 Drawing Sheets

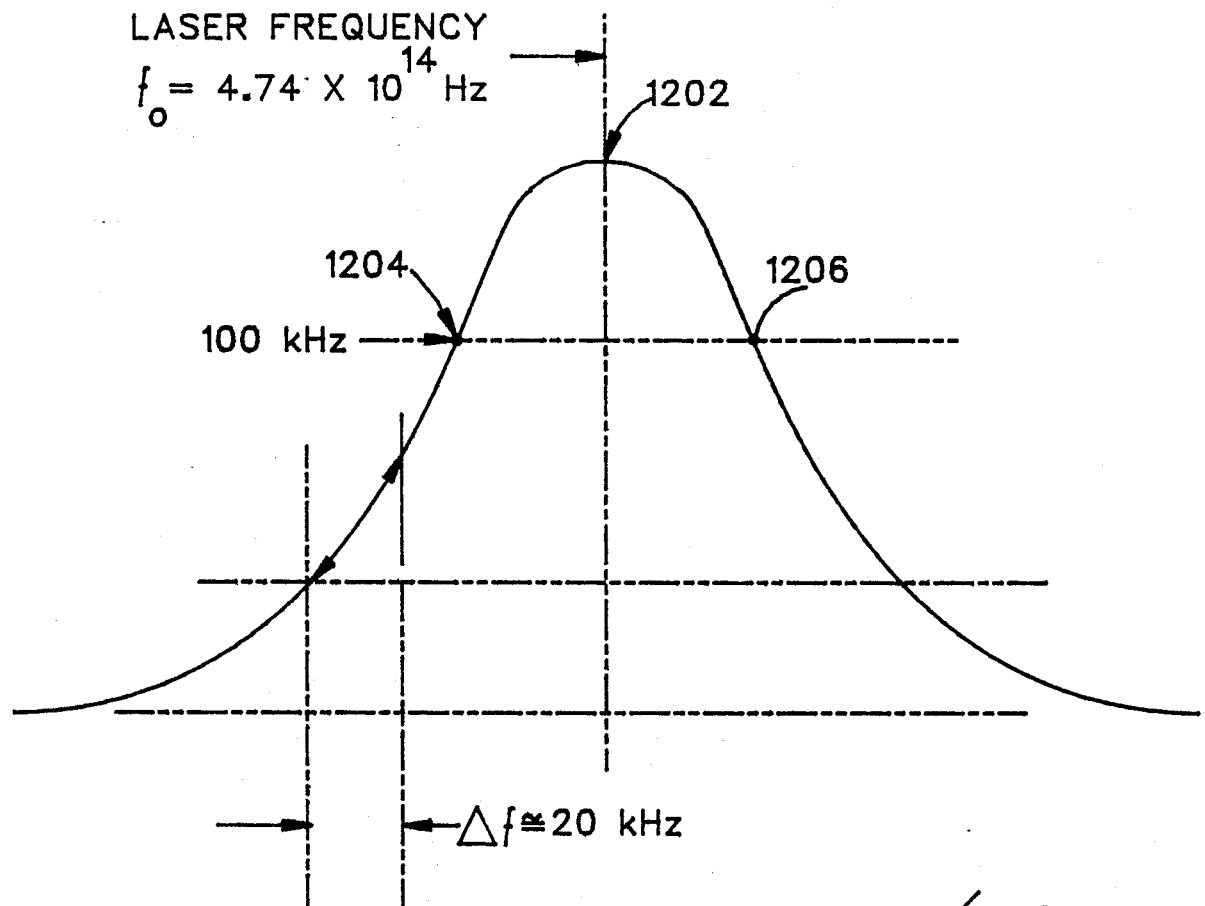
FIG.12a
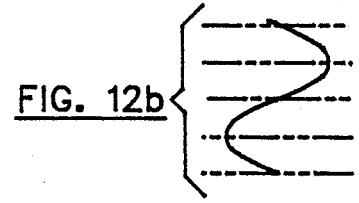
FIG. 12b
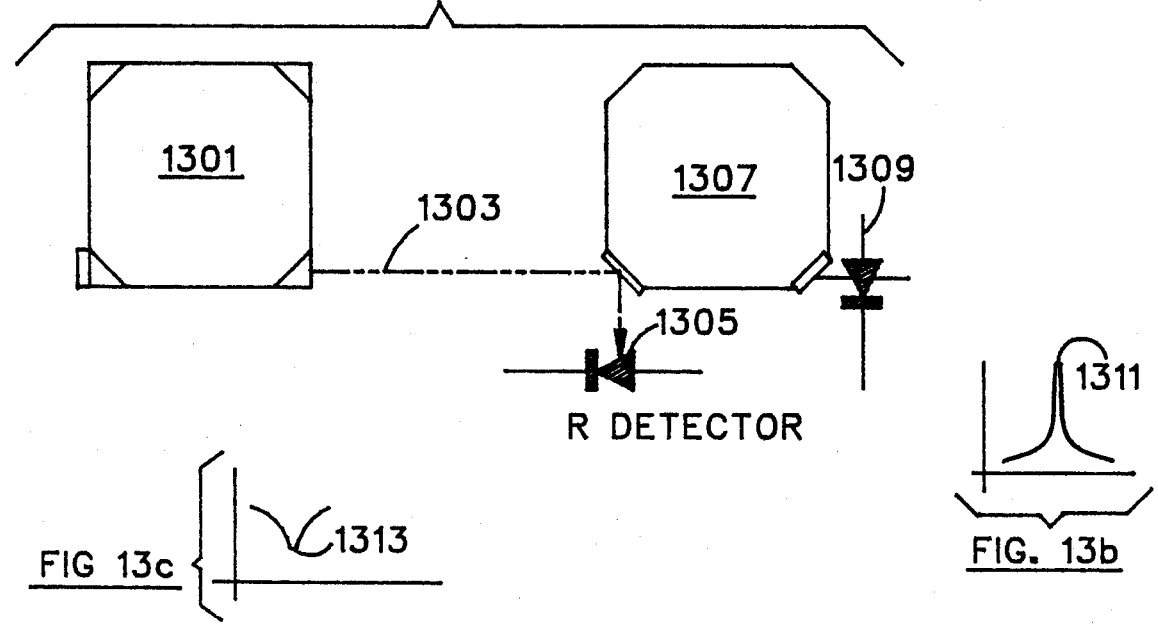
FIG.13a
FIG 13c
FIG. 13b

BALANCED DUAL SERVO VCO PASSIVE RING LASER GYROSCOPE

BACKGROUND OF THE INVENTION

1. Field of the Invention

The present invention relates to optical gyroscopes and more particularly to passive ring resonator gyroscopes which have bias and frequency errors resulting from mechanically or thermally induced dimensional changes.

2. Description of Prior Art

This application relates to five previously submitted applications, Ser. No. 676,322, "PASSIVE RING RESONATOR GYROSCOPE", filed 11/29/84, inventor Sanders et al; Ser. No. 701,891, "TWO SERVO LOOP PASSIVE RING LASER GYROSCOPE", filed 2/13/85, inventors SooHoo and Valle; Ser. No. 839,292, "TWO SOURCE LASER PASSIVE RING LASER GYROSCOPE", filed 3/13/86, inventor SooHoo; Ser. No. 864,232, "PHASE LOCKED PASSIVE RING LASER GYROSCOPE", filed May 19, 1986, inventor SooHoo; Ser. No. 28,833 "IDENTICAL SERVO FREQUENCY MODULATED PASSIVE RING LASER GYROSCOPE", forwarded Mar. 18, 1987, inventor SooHoo; and all having common assignee.

All five of these applications, describe a laser gyro having a single piece body incorporating a linear laser light source and a passive resonant cavity. The first application, Ser. No. 676,322, relies on three active servo loops for operation.

The second previous application, Ser. No. 701,891, describes a gyroscope having a single linear laser light source and a passive resonant cavity. This second gyro uses a first and second active servo loop for operation.

The third application, Ser. No. 839,292 describes a gyroscope having two laser sources. A first laser source produces a clockwise beam and a second laser source produces a counterclockwise beam. Both beams circulate in a sealed, evacuated passive cavity within the same body.

The fourth application, Ser. No. 864,232 describes a gyroscope using an external modulator to frequency modulate the input source beam and subsequently the detected clockwise and counterclockwise beams are demodulated at this same frequency to produce a more sensitive phase detection scheme.

The fifth application, Ser. No. 07/028,833, describes a gyroscope using an external modulator to frequency modulate the input beam, and the output beams are phase demodulated at this same frequency. In this application, two identical servo loops plus a cavity sum servo are used to create a more symmetric and sensitive servo system.

In a passive ring resonator gyroscope, a pair of monochromatic light beams counterpropagate about a closed-loop optical path, which forms a high Q resonant optical circuit. The stability of the path length between reflective surfaces forming the closed path is critical in maintaining resonance in the passive ring resonator cavity since dimensional changes contribute to bias frequency errors. A linear laser[1] and a ring resonator to form a prior art passive ring resonator is depicted in an article by S. EZEKIEL and S. R. BALSAMO titled "A Passive Ring Laser Gyroscope", *Applied Physics Letters*, Vol. 30, No. 9, 1 May 1977, pg. 478–480.

For description of lasers and resonators refer to: Yariv, A., *QUANTUM ELECTRONICS* (John Wiley & Sons, 1975) or Sargent, M., et.al., *LASER PHYSICS* (Addison-Wesley Pub., 1974). A linear resonator is typically conceived as a linear or standing wave resonator with forward and backward waves in which a light completes an optical round trip by reflecting off a mirror and retracing its path. The forward and backward waves create a standing wave in the cavity. In a ring resonator, each light completes an optical round trip without retracing its path and hence the path encloses an area as shown in Ezekiel's paper.

In the passive ring resonator, such as that described in the EZEKIEL reference, two beams traveling in opposite directions around the closed-loop optical path are injected into the passive ring resonator from a single frequency light source. The single frequency light source for the passive resonator is typically an external linear laser. Spectra Physics Inc. of Sunnyvale, Calif. produces stabilized lasers with the required characteristics. As the ring resonator gyroscope cavity rotates in inertial space, the two counterpropagating beams travel unequal path lengths. This path difference, due to rotation in inertial space, give rise to a relative frequency difference (Sagnac effect[2]) between the two counterpropagating beams. $\neq$E. J. Post, "Sagnac Effect", *Review of Modern Physics*, Vol. 39, No. 2, April 1967, p. 475–493.

A ring resonator, as opposed to a linear resonator, can exhibit the Sagnac effect and detect inertial rotation. The relative frequency difference is detected as a changing interference fringe pattern which is then electronically interpreted to indicate the direction and inertial rate of rotation of the passive gyro about the gyro's sensitive axis. The sensitive axis of the gyro is along the direction normal to the plane of the passive resonator.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two light beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes, such as that described in the EZEKIEL reference, typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the cavity optical table or bench.

U.S. Pat. No. 4,352,562 issued Oct. 5, 1982, inventor H. T. Minden, is related and of interest; however, this reference shows no tuning mechanism, and has a different frequency modulation scheme.

SUMMARY OF THE INVENTION

The objective of this invention is to provide a frequency locked passive ring resonator gyro suitable for use as a navigational instrument having reduced bias errors and bias error sensitivity while having substantially enhanced stability and sensitivity. This is accomplished by constructing a gyro having a single source laser and a passive ring resonator within a single housing or one piece body in which the total resonator path length is substantially below a half meter.

Another objective of this invention is to provide a single source passive ring laser gyroscope using two identical lock-in servos for peaking the intensity of the CW (clockwise) and CCW (counterclockwise) propagating light beams in the passive cavity.

Another objective of the invention is to change the passive cavity's path length with a control signal to achieve resonance locking of the cavity at a frequency midway between the CW and CCW resonances without locking one of the propagating beams to the passive cavity's path length.

A particular embodiment of this innovative passive ring resonator gyroscope has a single piece body, typically fabricated from a block of glass ceramic material such as ZERODUR ®, (a trademark of the JENA$^{ER}$ GLASSWERK SCHOTT & GEN. of MAINZ, GERMANY), which forms a fixed reference frame for all required optical elements, including first and second resonator cavities. A laser means is composed of a linear or "L" shaped laser that use the first cavity. This laser, when operated with suitable excitation, functions as a linear laser providing a source of single mode $TEM_{oo}$, single frequency light for the third resonator cavity.

In a more particular alternative embodiment, the laser means, laser resonator cavity has a transmitting optical port for transmitting stabilized single frequency light to the passive resonator cavity. The internal body-mounted reflective surfaces are coupled to and mechanically spaced by the single piece body. A gain medium, such as a Helium Neon gas mixture is contained in the laser resonator cavity but the passive cavity is evacuated.

A means for exciting the gain medium, including a power source, to induce lasing in the laser resonator cavity is provided. The output of the single frequency light sources is directed through at least one transmitting optical port of each of the laser resonators. A laser cavity adjusting servo samples the single frequency light source and adjusts the cavity to provide the single frequency light source at peak resonance.

The passive resonator cavity and its reflective elements form a passive high Q cavity having a closed optical path tuned to resonate at substantially the same frequency as the laser resonator cavity. Means are provided for splitting this source into first and second rays and coupling the first and second rays into the passive resonator cavity, thereby forming CW and CCW light beams in the passive resonator. These means are implemented using conventional beamsplitters, mirrors, and lenses.

Bias errors are diminished since the passive ring resonator is a passive device and has no internal excitation to frequency shift the cavity resonances. Bias errors due to axial gas flow or Fresnel drag is eliminated since the second resonator is evacuated. Taken together, these features form a gyroscope with increased stability and reduced bias errors.

A laser cavity servo controls the resonant frequency of the laser light source by sampling the intensity and locking the source laser to a fixed level. The first and second identical cavity servo loops are synchronized with a first oscillator that frequency modulates or dithers the second cavity's pathlength through the cavity's PZT at low (10 or less kHz) frequency. The first oscillator also provides a reference signal to a first and second phase-sensitive detector to obtain a first and second demodulated error signal for integration. The first and second integrated error signals from a first and second integrator are summed to provide a cavity path length control signal for the passive resonator.

The laser cavity has a laser cavity path length adjusting means such as a piezoelectric transducer responsive to the laser cavity path length control signal for shifting the resonant frequency of the laser cavity. The first cavity path length adjusting means shifts the frequency of the single frequency light source in response to the integrated intensity error signal applied to the PZT. Coming out of the source laser, the laser light is divided into two beams, CW and CCW by a beamsplitter. The frequency of the CW beam is upshifted by an acousto-optic modulator (AO1) driven by a voltage controlled oscillator (VCO1) at F1 before it is injected into the second resonator.

A first VCO adjusts its output frequency in response to a first servo control signal and adds enough of a frequency increase to the injected laser light source to shift the center frequency of the FCW beam entering the passive cavity (passive resonator) to the line width resonant point. A portion of the FCW beam is extracted from the resonator and a photodetector responds to the intensity signal. The intensity signal thus extracted is coupled to a first phase sensitive detector, also referenced to the reference signal generator. If the upshifted light source, FCW, is above or below the line center of the CW cavity resonance, the first phase sensitive detector develops a first error signal having a magnitude related to the FCW frequency error and a polarity related to the position of the error above or below the cavity's CW peak resonance.

A second VCO adjusts its output frequency in response to a second servo control signal and adds enough of a frequency increase to the injected laser light source to shift the center frequency of the FCCW beam entering the passive cavity (passive resonator) to the line width resonant point. A portion of the FCCW beam is extracted from the resonator and a photodetector responds to the intensity signal. The intensity signal thus extracted is coupled to a second phase sensitive detector, also referenced to the reference signal generator. If the upshifted light source, FCCW, is above or below the line center of the CCW cavity resonance, the second phase sensitive detector develops an error signal having a magnitude related to the FCCW frequency error and a polarity related to the position of the error above or below the cavity's FCCW peak resonance.

The frequency of the FCW and FCCW beams is shifted by respective acousto-optic modulators (AO1) and (AO2) driven by respective voltage controlled oscillators (VCO1) and (VCO2). Each VCO shifts the frequency of FO in response to the respective servo control signals. Each AO adds enough of a frequency increase to the injected laser light source to shift the center frequency of the respective beam entering the passive cavity to the passive cavity (passive resonator) line width resonant point.

In this embodiment, a means for detecting the frequency difference between a clockwise upshift VCO1 oscillator and a counterclockwise VCO2 upshift oscillator provides a signal representing a measure of the input body rate.

BRIEF DESCRIPTION OF THE DRAWINGS

FIG. 12a shows a waveform depicting the response characteristic and center frequency of a passive resonator for use with a HeNe laser.

FIG. 12b is a sinusoidal wave form illustrating a typical modulation range used in conjunction with a HeNe laser synchronous demodulator system, by a projection onto FIG. 11a.

FIG. 13a shows the relative position of two detector diodes in relation to a laser source on the left and a passive cavity on the right.

FIG. 13b shows the response characteristic of the rightmost detector.

FIG. 13c shows the response characteristic of the lower detector.

DESCRIPTION OF THE PREFERRED EMBODIMENT

Figure 1:
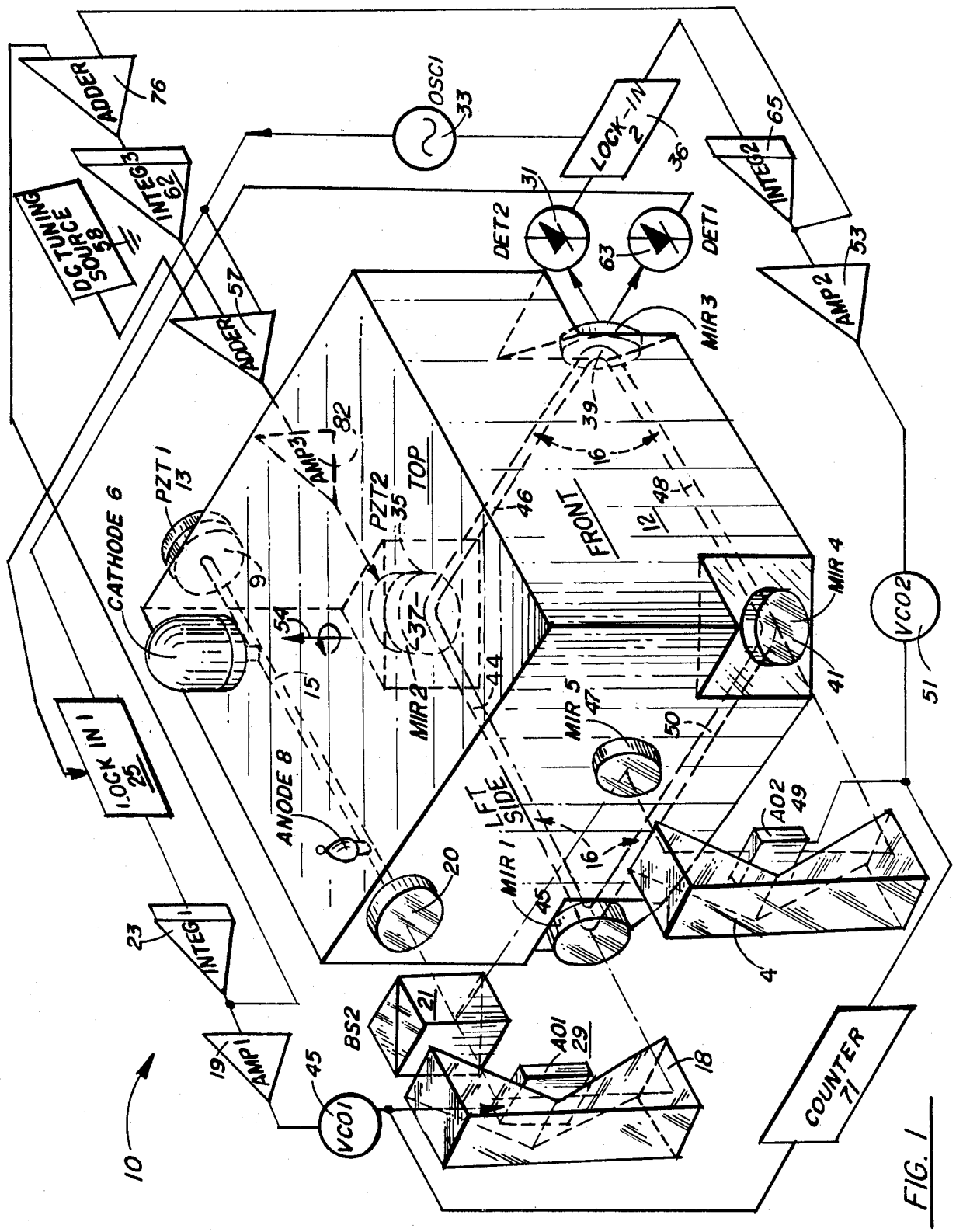
FIG. 1 is a perspective view of the passive ring resonator gyroscope.
Figure 2:
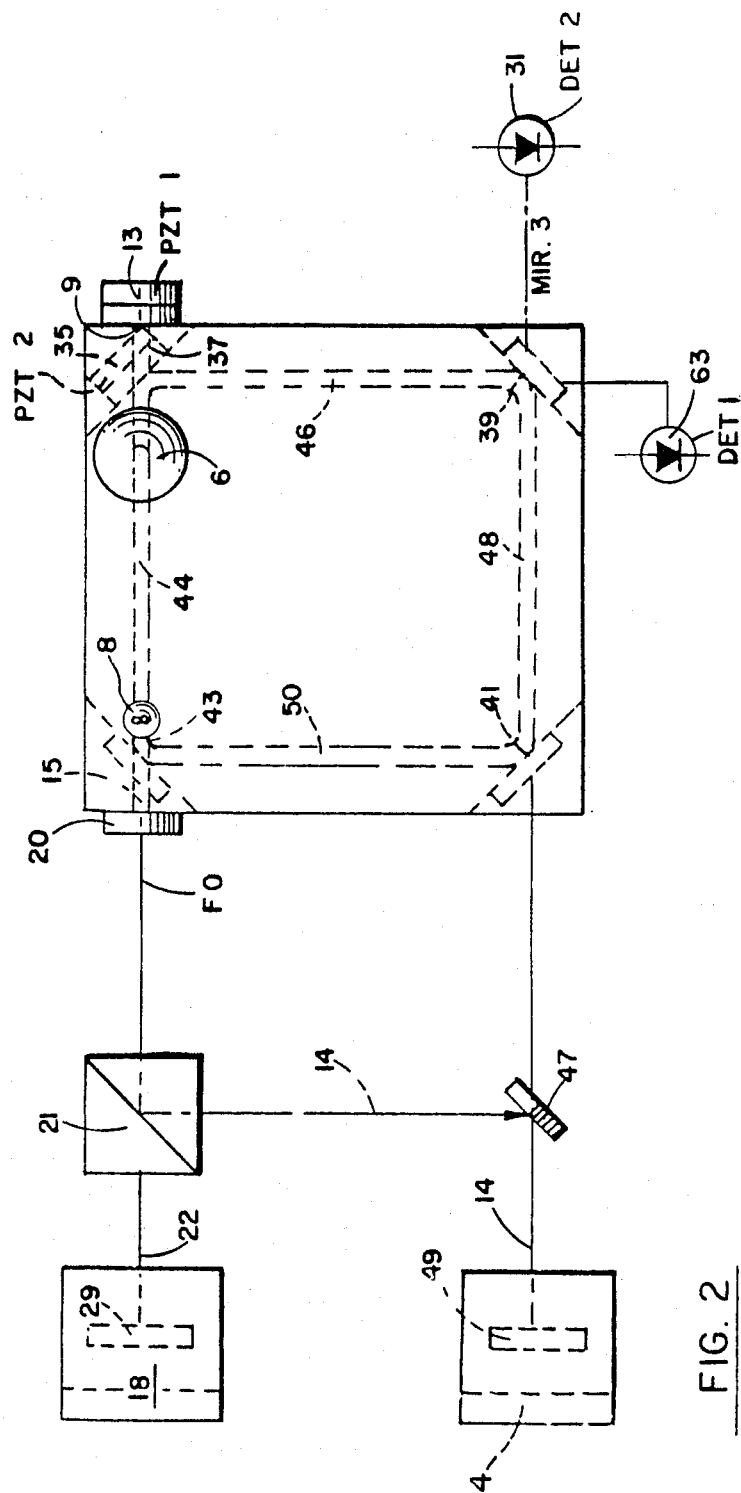
FIG. 2 is a top planar view of the passive ring resonator gyroscope body.

FIG. 1 shows the invention, passive ring resonator gyroscope (PRLG). The invention passive ring resonator gyroscope 10 is depicted having a single piece body 12 having integral first, and second resonator cavities 15, 16. The term "integral" is meant to convey the idea that the body 12 is formed from one homogeneous piece of material such as ZERODUR. The single piece body 12 has a laser cavity 15 and passive resonator cavity 16. The top layer cavity serves as a linear laser. A laser means such as the LINEAR LASER block shown in FIG. 7 has a power source 80. The LINEAR LASER uses the laser resonator cavity 15 which contains a lasing medium such as a mixture of Helium and Neon. The laser means has a laser cavity servo path length adjusting means (PZT1) 13 that is responsive to a laser control signal from a laser servo such as that represented in FIG. 7 by phantom block 11.

Figure 7:
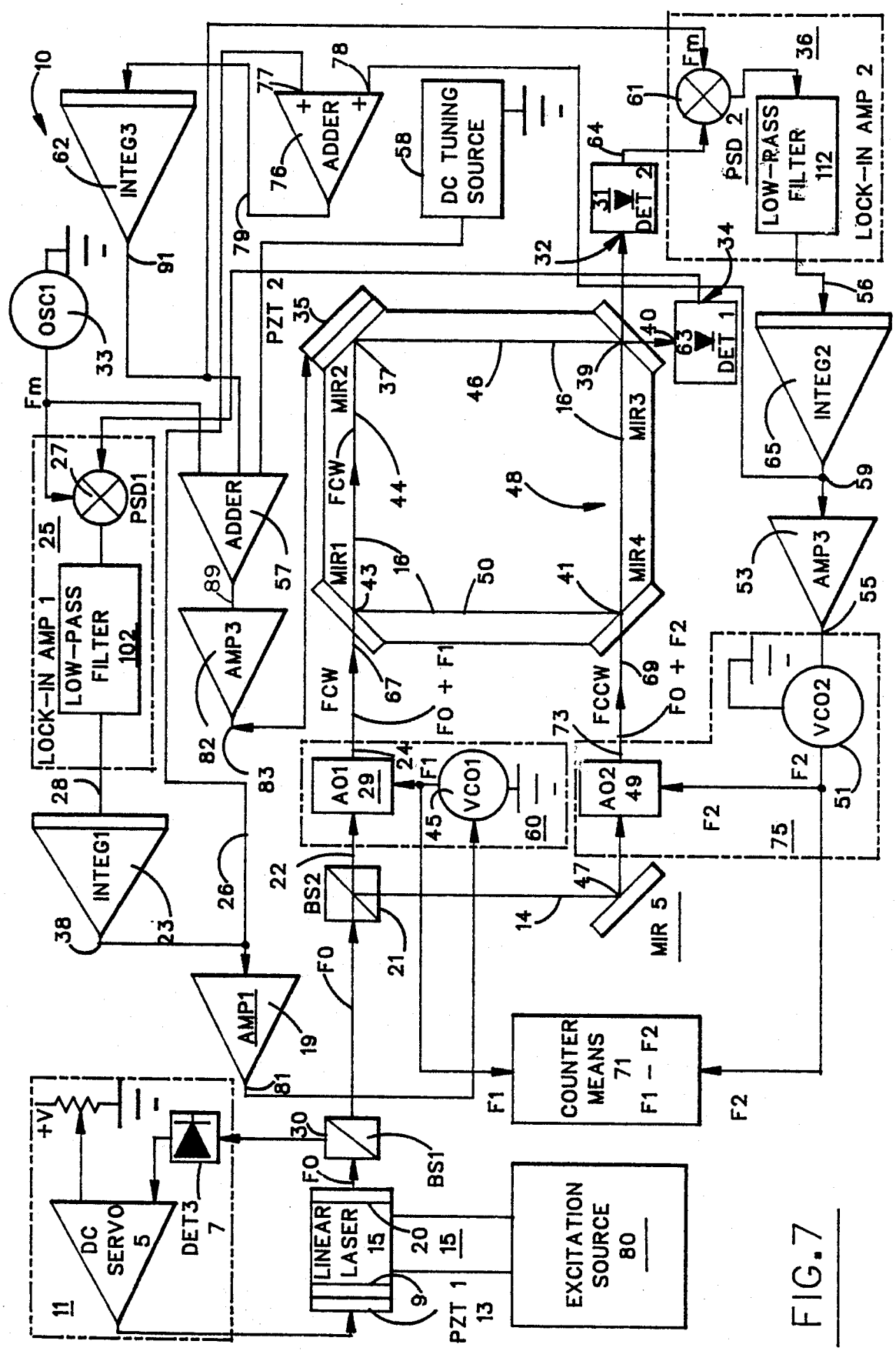
FIG. 7 is a schematic and block diagram of the passive ring resonator gyroscope showing two servo loops and a linear laser having its own control loop.

Referring to FIG. 7, the laser means within phantom block 11 has a means for sampling and detecting said single frequency light source such as DET3. The laser means also has a piezoelectric transducer (PZT1) 13 having a mirror surface 9 positioned within the integral laser cavity 15 to adjust the pathlength of reflected light within the laser cavity. The PZT1 is responsive to the laser control signal from DC SERVO 5 to peak adjust the output intensity of the single frequency light leaving said first resonator cavity at frequency FO.

BS1 30 represents a means for sampling the single frequency light source. BS1 has a receiving aperture responsive to the single frequency light (FO) from said first resonator laser means transmitting mirror 20. BS1 also has an aperture for providing a small sample of the single frequency light source (FO) to a detector means such as DET3, 7. DET3 is a conventional detector such as that described in connection with DET1 and DET2. Each of these detector units typically contain a reversed biased PIN diode and a low noise preamplifier. A detector such as the SD-00-12-12-231 manufactured by the *Silicon Detector Corp.* of Newbury Park, Calif. is suitable for use with a Helium Neon laser light source.

The first laser means (cavity 15) is shown sourcing single frequency light at frequency Fo through the first resonator partially transmissive mirror 20 to BS1 (beam splitter 1) 30 which extracts a small portion of the light for use by the laser servo 11. The beam then passes to beamsplitter 21 to form first and second rays 22, 14, respectively.

This laser servo provides a single frequency light source at frequency (FO) from a transmitting aperture through partially transmissive mirror 20. Elements of the laser servo are not shown in FIG. 1 to reduce the complexity of FIG. 1. These elements are depicted schematically in FIG. 7. The output of the linear laser is not influenced by inertial rate inputs to the gyroscope.

Referring to FIG. 7, the passive resonator cavity 16 is a passive high Q evacuated cavity having a path length adjusting means such as PZT2 35 responsive to the reference signal for modulating the optical path length of the passive resonator cavity 16 at a reference signal frequency, typically, in the range of from 100 to 5 KHz. The path length adjusting means is responsive to a passive cavity path length servo signal for adjusting its closed optical path length.

PZT2 35 shown in FIG. 7 represents a piezoelectric transducer. PZT2 functions as an electromechanical transducer, attached to reflective surface 37 so as to modulate the second resonator's optical path length at the dither frequency Fm and also helps to maintain the propagating light FCW and counterpropagating light FCCW at peak resonance within cavity 16. PZT2 also adds a dynamic path length adjusting means for adjusting the optical path length of the passive resonator cavity. PZT2 has an input terminal coupled via a signal line to the output of AMP 3 82.

Figure 3:
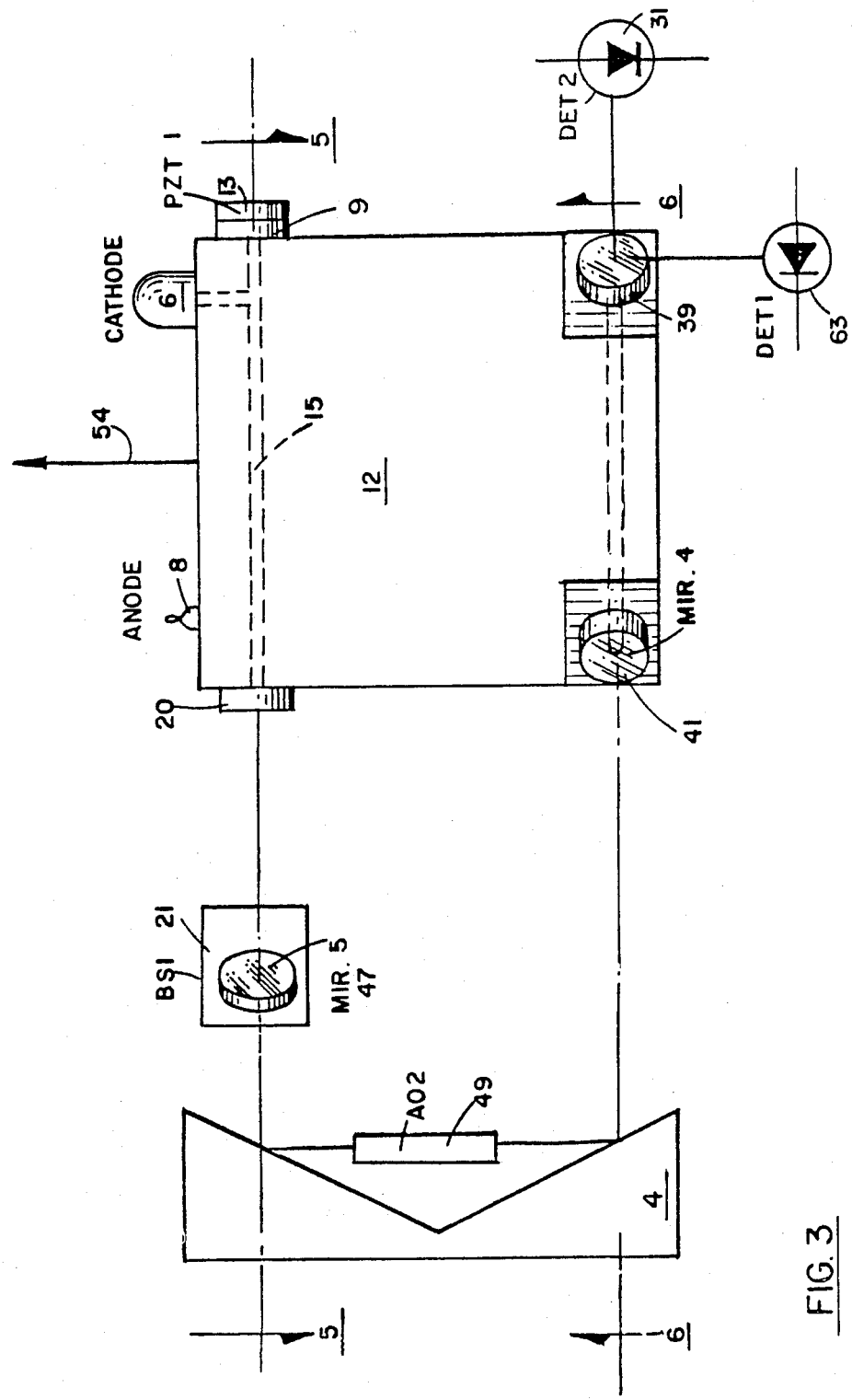
FIG. 3 is a front view of the passive ring resonator gyroscope body.
Figure 4:
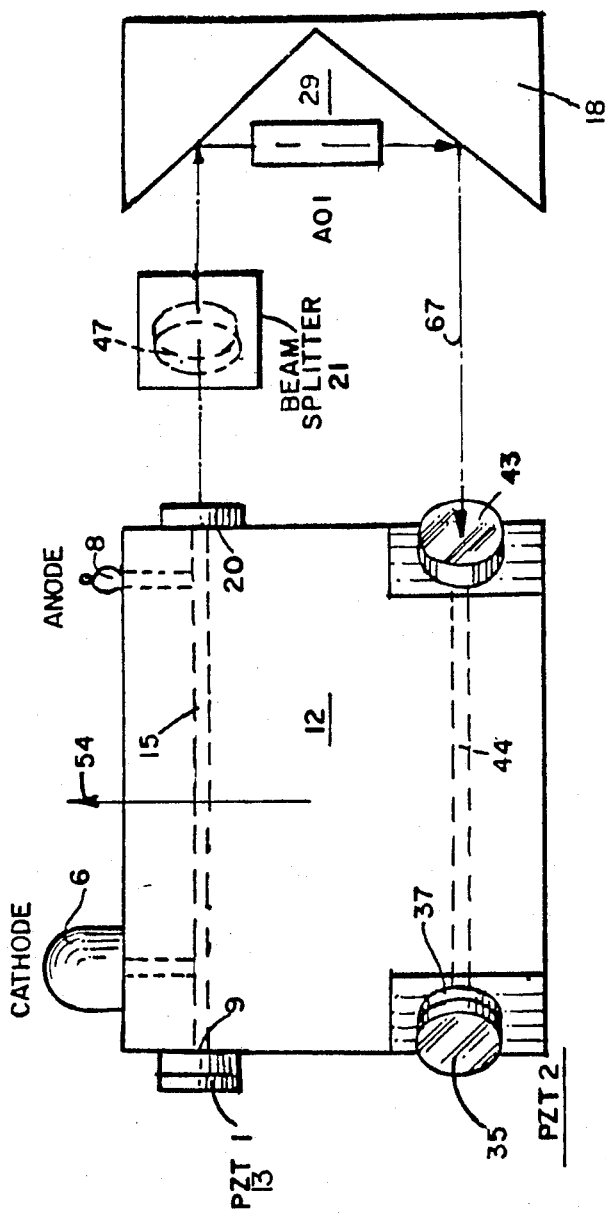
FIG. 4 is a rear view of the passive ring resonator gyroscope body.

The second resonator cavity 16 has a closed optical path with first, second, third, and fourth segments, 44, 46, 48, 50 tuned in combination to resonate at a frequency derived from the first resonator cavity. The sensitive axis of the PRLG, characterized by Vector 54, as shown in FIG. 3 and FIG. 4, is essentially normal to the plane of the closed second optical path established by the plane of segments 44, 46, 48, 50.

BS2 21 is a beamsplitter and represents a means responsive to the single frequency light source for splitting the single frequency light (FO) into respective first and second single frequency rays 22, 14 respectively. Four mirrors MIR1 43, MIR2 37, MIR3 39 and MIR4 41 are used at the corners of the optical path to join the segments and close the path optically.

Figure 8:
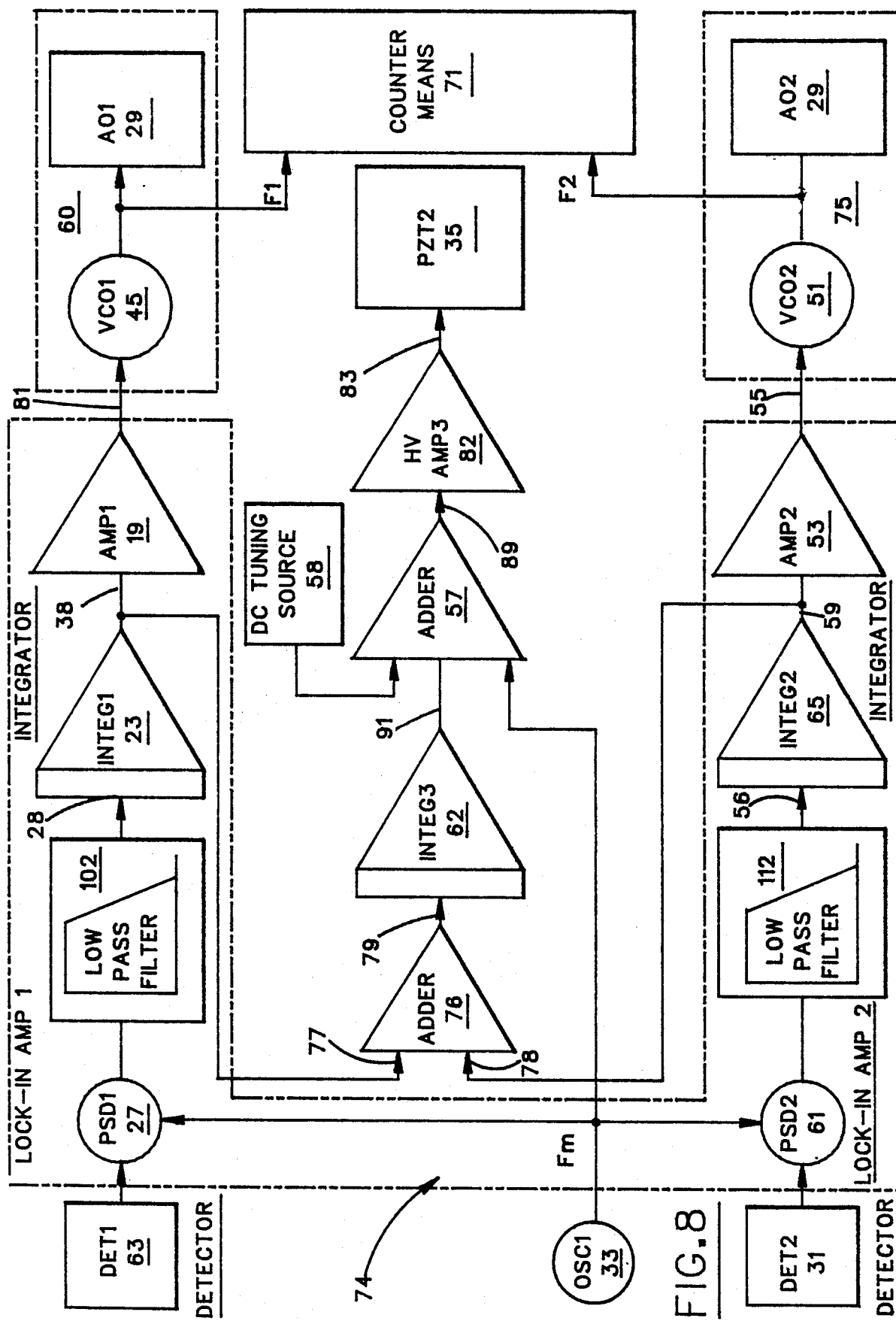
FIG. 8 is a block diagram of the passive cavity servo electronics.
Figure 10:
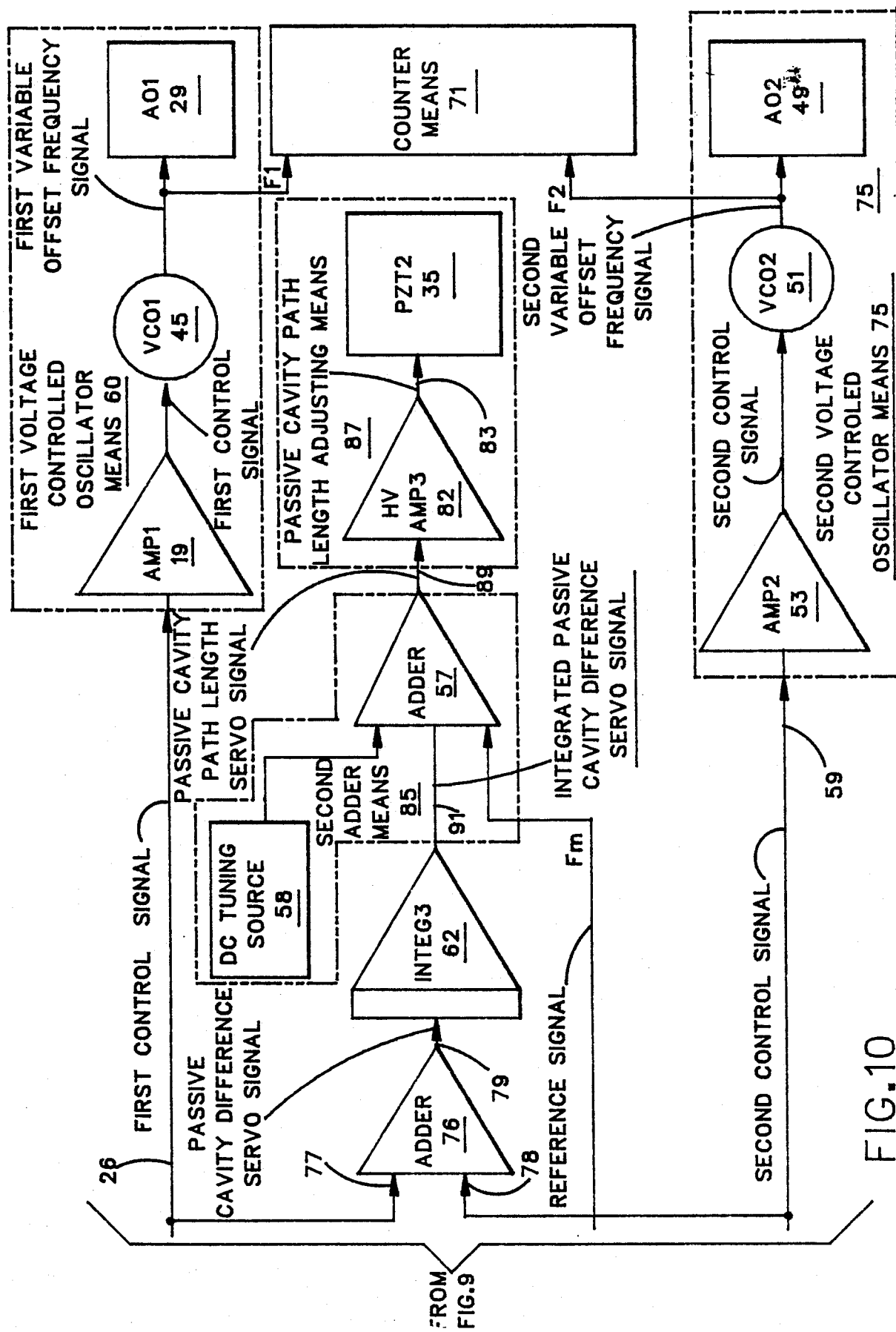
FIG. 10 is an expanded diagram of the right portion of the passive cavity electronics of FIG. 8.

Referring to FIGS. 7, 8, and 10, elements within phantom block 60 represent a first voltage controlled oscillator means responsive to the first single frequency ray 22 and to the first control signal via signal line 81 for frequency shifting the first single frequency ray 22 center frequency by a first variable offset frequency (F1) to form a propagating light source 24 at the output aperture of AO1 29, to supply a propagating light ray 67. These elements comprise a first voltage controlled oscillator (VCO1) 45 for providing a first variable offset frequency signal (F1) and a first acousto-optic modulator (AO1) 29 responsive to the first ray 2 and to the first control signal for upshifting the frequency of the first 22 ray by a frequency equal to the frequency of said first voltage controlled oscillator output signal F1 and for providing the propagating light source (FCW) from source 24 as ray 67. MIR1 43 couples the propagating light ray 67 into the passive resonator cavity to form a propagating light beam (FCW).

Beamsteering optics, such a first prism 18 couples the first ray as beam 22 through AO1 (acousto-optic modulator) 29. AO1 is a frequency shifter driven by VCO1, 45, a voltage controlled sinusoidal oscillator typically operating at a second reference frequency in the range of from 40 MHz to 80 MHz. The AO1 device is structured to up or down shift the frequency of the first ray 22 to a frequency F1 higher or lower than that Fo of the first ray 22.

Acousto-optic device AO1 29 and VCO1 45 in combination as shown by phantom block 60 in FIG. 7 represent a means for frequency shifting the first ray in response to a first control signal, such as the signal from the output of AMP1, 19.

Elements within phantom block 75 as shown in FIGS. 8 and 10 represent a second voltage controlled oscillator means responsive to the second single frequency ray 14 and to the second control signal via signal line 55 for frequency shifting the second single frequency ray 14 by a second variable offset frequency (F2) in response to the second control signal to form a counterpropagating light source 73 at the output aperture of AO2 49 to supply a counterpropagating light ray 69 (FCCW). These elements comprise a second voltage controlled oscillator (VCO2) 51 for providing a second variable offset frequency (F2); and a second acousto-optic modulator (AO2) 49 responsive to the second ray and to the second control signal for upshifting the frequency of the second ray 14 by a frequency equal to the frequency of the second voltage controlled oscillator output signal F2 and for providing the propagating light source (FCCW) from aperture 73 as ray 69. MIR4 41 couples the counterpropagating light ray (FCCW) into the passive resonator cavity via MIR4 41 to form the counter propagating light beam.

The respective DC AMPLIFIERS (19, 53) are driven by the outputs of respective integrators to apply first and second control signals to the VCO's (45, 51) which shift the input CW and CCW beams in a direction to increase the response of the signal from the passive resonator cavity. As the signal from the DC AMP (19, 53) reaches a value sufficient to peak the tuning of the resonator, the signal out of the mixer goes to zero and the output of the integrator stops changing. Therefore this passive ring laser design has two identical servo loops controlling the CW and CCW beams and resonances. The error signals (26, 59) from the integrators are summed and then integrated to provide the path length control signal for the passive resonator. In addition, a DC tuning source 58 and the frequency dither from OSC1 33 is added into the amplifier 82 to path length control's PZT2 35.

Referring to FIG. 1, the second ray 14 is reflected by MIR5, 47 and beamsteering optics 36 to AO2, 49. Ray 14 is upshifted in frequency by AO2. Aperture 73 of AO2 serves as a counterpropagating light beam source FCCW for counterpropagating light beam 69. Counterpropagating light beam 69 is a counterclockwise ray, FCCW as it passes through MIR4, a partially transmissive mirror 41. The AO2 device 49 upshifts the frequency of ray 14 by F2 hertz to form the counterpropagating beam FCCW that enters cavity 16 via MIR4, at 41.

Acousto-optic device AO2 49 and VCO2 51, in combination as shown by phantom block 75 in FIG. 7, represent a means responsive to a second ray for frequency shifting the second ray in response to a second control signal, such as the signal from the output of AMP2, 53.

The first partially transmissive and receiving port 43 is characterized to receive and pass the first light ray 67 into the passive resonator cavity 16 to form the propagating light beam (FCW).

The second partially transmissive and receiving optical port 41 is characterized to receive and pass the frequency offset beam 69 into the second resonator 16 cavity to form a counterpropagating light beam (FCCW).

Detector DET1 63 represent a first detector means optically coupled to sample the (clockwise) propagating light beam (FCW) to detecting a first offset frequency error signal via MIR3 39 at reference signal frequency (Fm) and to provide a first offset frequency error signal via signal line 34. DET2 64 represents a second detector means that is optically coupled to sample the counterpropagating light beam (FCCW) for detecting a second offset frequency error signal via MIR3 39 at reference signal frequency (Fm) and to provide a second offset frequency error signal via signal line 64.

Figure 9:
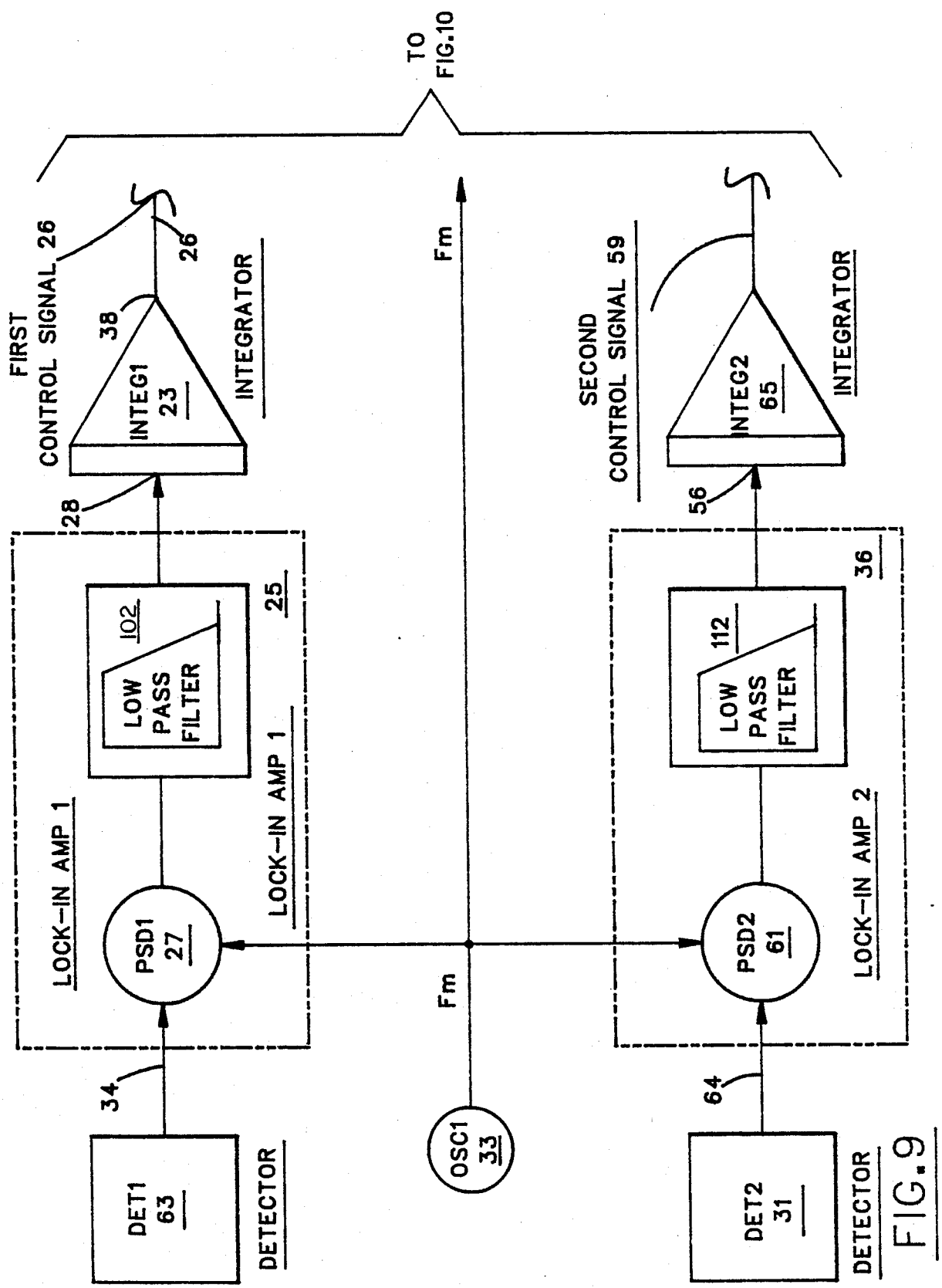
FIG. 9 is an expanded diagram of the left portion of the passive cavity electronics of FIG. 8.

FIG. 8 is an expanded schematic view of electronic elements shown in FIG. 7. FIGS. 9 and 10 are expanded views of FIG. 8. Elements within phantom box 74 in FIG. 8 represents a CAVITY SERVO means responsive to the reference signal (Fm) and to the first and second offset frequency error signals from the detector means DET1, DET2 for providing a first control signal via signal line 24 to the first voltage controlled oscillator means 60 for frequency shifting the first frequency modulated ray by a first variable offset frequency to maintain the propagating light beam (FCW) in the passive resonator at peak resonance and to provide a second control signal via signal line 55 to the second voltage controlled oscillator means for frequency shifting the second frequency modulated ray by a second variable offset frequency (F2) to control and maintain the counterpropagating light beam (FCCW) in the passive cavity 16 at peak resonance.

FIGS. 8 and 10 show ADDER 76, which represents a FIRST ADDER means responsive to the first and second control signals via inputs 77 and 78 respectively for algebraicly adding the first and second control signals to provide a passive cavity path length difference servo signal via ADDER output 79. INTEG 62 represents an electronic INTEGRATOR means responsive to the passive cavity path length difference servo signal from ADDER output 79 for providing an integrated passive cavity difference servo signal at integrator output 91.

Elements within phantom box 85 represent a SECOND ADDER MEANS. SECOND ADDER 57 represents means for adding the integrated passive cavity difference signal from integrator output 91 to the reference signal (Fm) to provide the passive cavity path length servo signal at ADDER 57 output 89.

The cavity path length servo signal is coupled to the input of HV AMP 82 which, together with PZT2 35, as shown within phantom block 87 represents a PASSIVE CAVITY PATH LENGTH ADJUSTING MEANS for constantly adjusting the passive cavity path length servo signal to keep the passive cavity at peak resonance at a frequency substantially mid-range between the propagating (FCW) and the counterpropagaing beams (FCCW).

DC TUNING SOURCE 58 within phantom block 85 represents a means for tuning the cavity to adjust the cavity to be substantially resonant at the frequency of the single frequency light source in the absence of a body rate input.

The PRLG shown has a fixed frequency reference signal generator 33 to provide a reference signal at a fixed reference frequency (Fm). Referring to FIG. 7, oscillator, OSC1, 33 provides the reference signal, a sinusoidal signal at a dither frequency Fm (typically 1–10 kHz). The reference signal is applied to the passive cavity and to PSD1 27 and PSD2 61 (Phase Sensitive Detector) for servo lock-in operation.

Referring to FIG. 7, the FCW beam is transmitted through the cavity 16 at MIR3 39 and is focused on output detector 63 at DET1 receiving aperture 40. Detector DET1 31 and DET2 63 are typically silicon photodiodes, such as model FND-100 by EG&G Corp. of Wakefield, Mass.

Referring to FIG. 9, DET1 63 samples the FCW beam and provides a first offset frequency error signal on signal line 34 to the input of PSD1 27. PSD1 and Low Pass Filter 102 form LOCK-IN AMP 1 25 and provide a positive or negative first phase error signal on signal line 28 to INTEG1 23 for integration. Referring to FIG. 9, INTEG1 23 provides a first phase control signal on signal line 38 to the inputs of AMP1 19 on FIG. 10 and via signal line 26 to ADDER INPUT 77. AMP1 scales and conditions the first phase control signal and provides a scaled first control signal to VCO1 45. The output signal from VCO1 is fed to AO1 29 to shift the frequency of the first ray by a first variable offset frequency (F1) to form the propagating light beam (FCW) within the passive cavity 44, 46, 48, 50. The first control signal's amplitude and polarity are controlled by INTEG1 23 and AMP1 19 to shift the frequency of F1 in a direction to drive the first phase error signal on signal line 28 to zero volts.

Referring to FIG. 9, the second detector DET231 samples the FCCW beam and provides a second offset frequency error signal on signal line 64 to the input of PSD2 61. PSD2 and Low Pass Filter 112 form LOCK-IN AMP 2, 36 which provides a positive or negative second phase error signal on signal line 56 to INTEG2 65 for integration. INTEG2 65 provides a second phase control signal on signal line 59 to the inputs of AMP2 53 on FIG. 10 and via signal input 78 to ADDER 76. AMP2 53 conditions the second phase control signal and provides a second control signal to VCO2 51. The output signal from VCO2 is fed to AO2 49 to shift the frequency of the second ray 14 by a second variable offset frequency (F2) to form the counterpropagating light beam (FCCW) within the passive cavity 44, 46, 48, 50. The second control signal's amplitude and polarity are controlled by INTEG2 65 and AMP2 53 to shift the frequency of F2 in a direction to drive the second phase error signal on signal line 56 to zero volts.

Elements such as LOCK-IN AMP 1, INTEG1 AMP1, and LOCK-IN AMP 2, INTEG2 AMP2 represent, in combination, two identical cavity servo means responsive to the reference signal Fm and to the first and second offset frequency error signals from the detectors for providing a first control signal to the first voltage controlled oscillator VCO1 for frequency shifting the first ray by a first variable offset frequency (F1) to maintain the propagating light beam (FCW) in the second resonator at peak resonance by driving the difference between the detected first offset frequency error signal and the fixed reference signal to a minimum value and to provide a second control signal to the second voltage controlled oscillator means for frequency shifting the second ray by a second variable offset frequency (F2) to control and maintain the counterpropagating light beam (FCCW) at peak resonance by driving the difference between the detected second phase error signal and the fixed frequency reference signal to a minimum value.

Referring to FIG. 10, the combination of ADDER 76, in cooperation with INTEG3 62, and SECOND ADDER MEANS 85 represents a means responsive to the first and second control signals in summing input terminals 77 and 78 for providing a passive cavity path length servo signal to the passive cavity path length adjusting means such as PZT2 and for constantly adjusting the passive cavity path length servo signal to keep the passive cavity at peak resonance at a frequency substantially mid-range between the propagating and the counterpropagating beams. This method of path length control extends the oscillation range of both VCOs and keeps the CW and CCW cavity resonance centered about the frequency the cavity is resonant at when the cavity is not rotating.

The integrator INTEG3 62 input terminal is coupled to the ADDER 76 output terminal via signal line 79. The integrator 62 output terminal is coupled via AMP3 82 to provide the passive cavity path length servo signal to the passive cavity path length adjusting or dither means such as PZT2 35. The cavity path modulation (Fm) or dither from OSC1 33 and DC tuning voltage from DC TUNING SOURCE 58 are also added in by adder 57 to form a composite signal called a passive cavity path length servo signal. Phantom block 87 represents a PASSIVE CAVITY PATH LENGTH ADJUSTING MEANS having HV AMP82 and PZT2 35. The high voltage amp HV AMP 82 amplifies the path length servo signal and provides it to the passive cavity's PZT2 35.

Phantom block 87 represents a SECOND ADDER MEANS. The DC tuning input from DC TUNING SOURCE 58 to ADDER 57 is used to provide an initial coarse adjustment by manually tuning the voltage to center tune the cavity to the Fo frequency of the linear laser when the inertial rates into the gyro are zero. The cavity path modulation (Fm) is used as a means to phase sensitive detect the output beams in the signal analysis portion of the servo loops.

COUNTER MEANS 71 represents an OUTPUT COUNTER means for measuring and outputting the frequency difference between the first variable offset frequency (F1) and the second variable offset frequency (F2). The measured frequency difference between F1 and F2 represents the difference in frequency due to an input gyro body rate about the gyro sensitive axis.

COUNTER MEANS 71 is typically a counter such as a HP5335 by Hewlett Packard for use in a laboratory, but in alternative product designs, the counter would be fabricated from conventional high speed logic circuit elements such as MECL or ECL logic by MOTOROLA suitable for use at frequencies at and above F1, the upshift frequency of the VCO signal generator (to the AO).

FIG. 12a depicts the pass band of a typical passive cavity having a resonance peak at 1202. The approximate frequency spread between reference 1204 and 1206 represents a typical frequency range between the half-power points and is included in FIG. 12 along with the indicated laser center frequency, to provide the reader with a visual appreciation of the "Q" of the second resonator. The phrase "frequency stabilization" is understood to mean phase sensitive detecting and is also meant to include the principle of servo locking the laser output to the intensity peak of the passive cavity.

A HeNe laser typically has an instantaneous line width of less than one Hz but the operating frequency is subject to considerable jitter.

FIG. 13a characterizes a laser source directing a beam at a representative port with a portion of the beam being reflected to a detector 1305. FIG. 13b depicts a peak response to incident light from detector E. J. Post, "Sagnac Effect", *Review of Modern Physics*, Vol. 39, No. 2, April 1967, p. 475–493 incident light from detector 1309. FIG. 13c shows a dip in the background of the light intensity 1313 striking the detector such as 1305 as the laser source at 1301 is tuned to the resonance point of the passive cavity 1307.

The first and second detectors 33 and 64 of FIG. 7 are positioned to receive the transmitted light as detector 1309 does from laser 1301 in FIG. 13a. FIG. 13b shows a response curve having a peak at resonance 1311. This response characteristic corresponds to that for diode 1309 receiving the transmitted input beam. The response curves for detectors 63 and 31 peak at resonance because, in the embodiment depicted by FIG. 1 and FIG. 7, these diodes receive the transmitted light from mirrored surface 39. At resonance, second cavity 16 absorbs light entering through mirror surfaces 43 and 41, and hence transmits the most light through MIR3 39.

The dip represented by FIG. 13c would also typically have half-power points separated by 40 kHz. Referring to FIG. 13a, typically, a HeNe input laser would have its output at $4.74 \times 10^{14}$ Hz injected along path 1303 into the passive cavity 1307.

Figure 5:
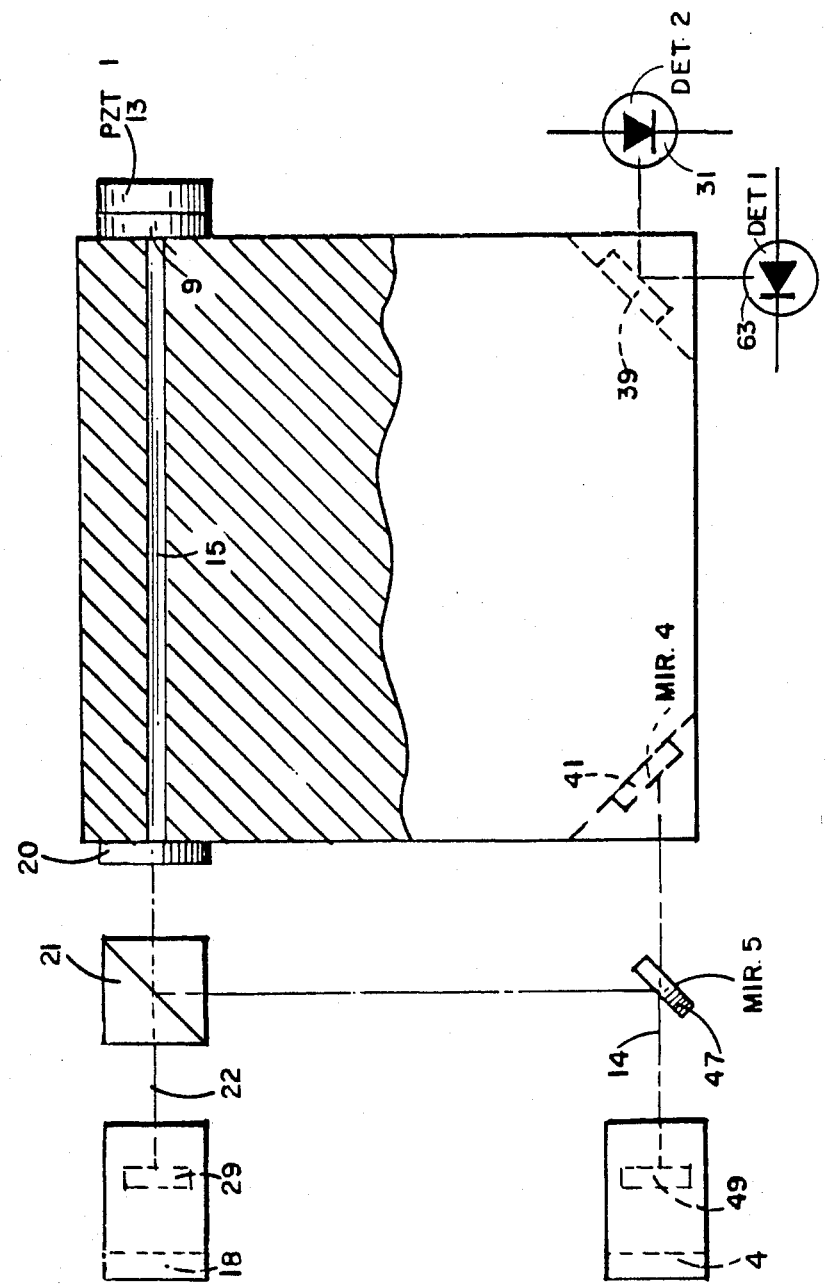
FIG. 5 is a partial sectional view of the passive ring resonator gyroscope body taken along line 5—5 of FIG. 3.

FIG. 5 shows the first resonator cavity 15 in section. The laser resonator cavity has a transmitting optical port means at first cavity port 20 for transmitting stabilized single frequency light F0 and at least two internal body-mounted reflective surfaces such as partially transmissive mirror 20 and mirror surface 9 on piezoelectric transducer PZT1, 13. An appropriate gain medium, such as a mixture of Helium and Neon, is contained in the first resonator cavity 15 at a pressure in the range of 4 to 10 torr when sealed.

Figure 6:
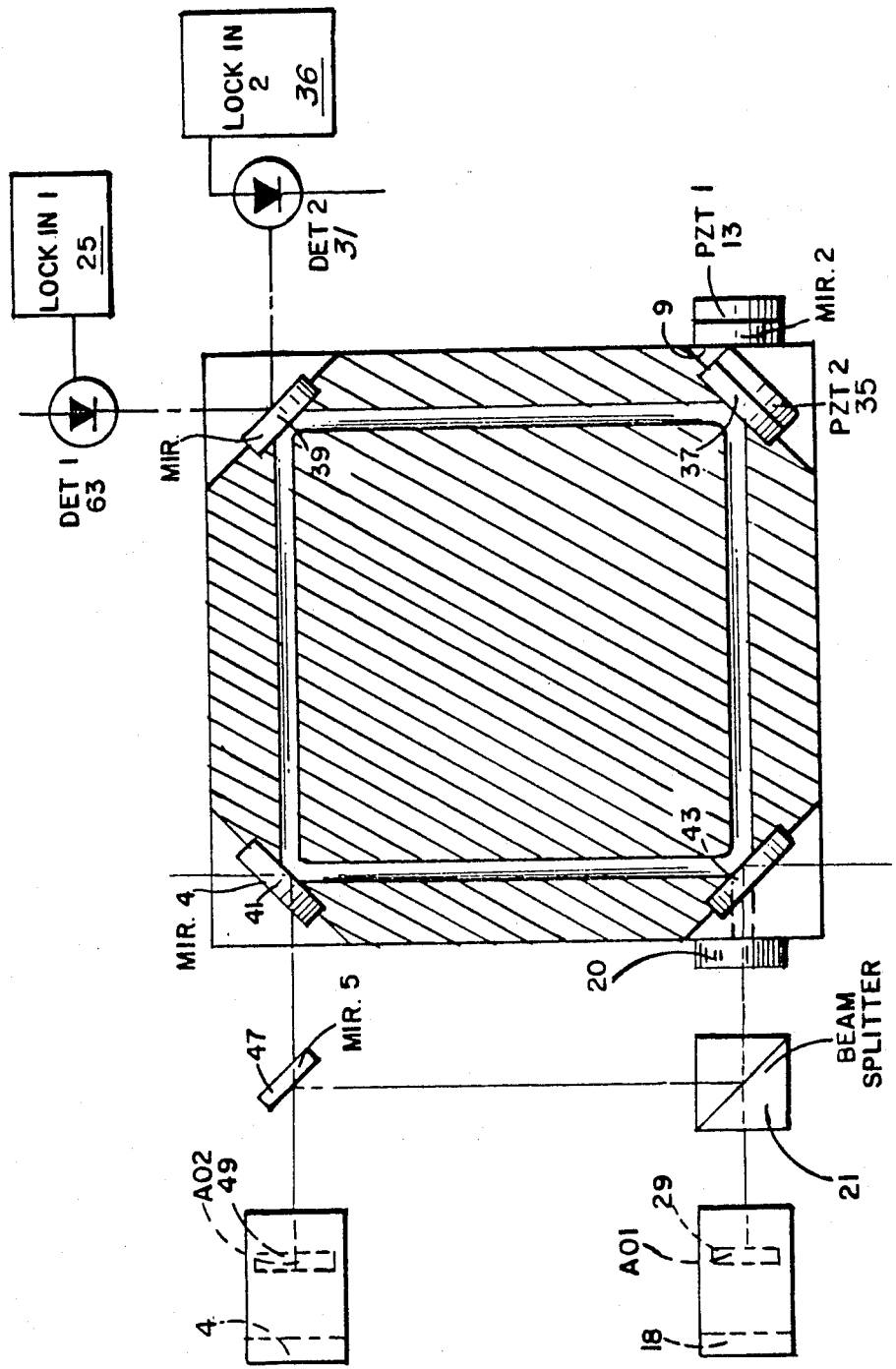
FIGS. 6 is a bottom cross section taken along line 6—6 of FIG. 3 looking up.

FIG. 6 shows the second resonator cavity in section as viewed from the bottom surface to the top of the gyro. The second cavity 16 has first, second, third and fourth evacuated hollow segments, 44, 46, 48, 50. In the case of a triangular cavity (not shown) only three segments would be used. The segments of passive cavity 16 are coupled at their ends to form a closed planar evacuated path. For example, one end of segment 44 is joined with one end of segment 46 at an intersection where mirror surface 37 is attached to PZT2 35.

Referring to FIG. 7, block 80 titled EXCITATION SOURCE represents a means for exciting the gain medium within said first cavity 15 to induce lasing. This element is typically a controllable current source capable of an output voltages determined by the ionization potential of the gas mixture and an output current in the range of one to ten milliamperes.

The first and second resonator cavities induce output signal frequency bias error in response to small body dimension changes, such as those induced by temperature changes. The passive resonator passive cavity 16 is positioned, i.e. is in parallel alignment, and is dimensioned in relation to the laser resonator cavity to experience relatively equivalent optical path length changes in response to induced body dimension changes.

The laser resonator cavity 16 is positioned and dimensioned in relation to the passive resonator cavity 16 to provide partial dimensional change compensation for optical path length changes in response to induced body dimension changes by temperature or external force. Bias errors relating to temperature induced body dimension changes or to changes from external forces applied to said body are cancelled providing a passive ring resonator gyroscope having enhanced stability.

Although FIGS. 1 and 7 each depict use of straight cavities for the laser means, the use of an L-shaped laser as the laser resonator cavity above, below or in the same plane as the passive resonator are anticipated to be alternative embodiments that can offer the promise for dimensional compensation. Additional alternative embodiments include an arrangement in which the first laser means has segments orientated to be transverse or orthogonal to the plane of the passive resonator cavity 16.

OPERATION

Due to the Sagnac effect, the path lengths of the clockwise (FCW) and counterclockwise (FCCW) beams in ring resonator differ as a function of body rotation rates. Consequently, the resonant frequencies for CW and CCW light in the passive cavity have a corresponding difference dependence. The goal of the optics and electronics of the BALANCED DUAL SERVO VCO PASSIVE RING LASER GYROSCOPE (PRLG) is to detect the frequency difference that arises between the CW and CCW beams due to inertial rotations. The intent of the single body small source linear phase locked laser/passive cavity design is to eliminate bias errors caused by the resonant frequencies of the linear laser and passive cavity changing with respect to one another. In this integral, single block, or single piece body these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 15 is made equal to the Free Spectral Range of the second resonant cavity 16. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. The first resonator forming the laser means is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonator using two curved mirrors requires a resonator length between mirrors equal to 2L. This configuration also has a F.S.R. equaling c/4L. With the criteria that:

$$(F.S.R.)_{Laser} = (F.S.R.)_{Passive\ Resonator} = c/4L,$$

it is apparent that any change in the F.S.R. of the laser resonator will equal any change in the F.S.R. of the passive ring resonator which may arise from thermal or mechanical changes.

Mirrors with piezoelectric (PZT) backings supply a path length adjusting means to the passive resonator cavity. This adjustment effects both the paths of the CW and CCW beams.

Light transmitted through the passive cavity from the CW direction is detected and phase sensitive demodulated by employing a mixer or phase sensitive detector (PSD). The phase error signal is integrated, amplified and then applied as shown in FIG. 8 to the input of VCO1 to bring the CW beam to resonance. Light transmitted through the passive cavity from the CCW direction is detected and phase sensitive demodulated by the PSD. The second phase error signal is integrated, amplified and then applied to the input of VCO2 to bring the CCW beam into resonance. The respective VCOs shift the respective frequencies of the injected CW and CCW beams to bring them into resonance in the passive cavity. Identical servo loops are used for both CCW and CW beams. In the preferred embodiment, a DC tuning source signal from DC TUNING SOURCE 58 is summed along with the path length control signals to provide for initial coarse frequency alignment. The frequency modulation or dither for path length control is also summed with this signal. The sum of the first and second phase error signals is used as a passive cavity path fine length servo control signal to compensate for the thermal and mechanical drifts in the cavity and also to keep the passive cavity at peak resonance midway between the CW and CCW resonances.

The ring laser gyroscope shown in FIG. 1 has two identical servo control loops, each being referenced to OSC1 (oscillator 1) 33.

Laser 15 provides a relatively coherent light source at frequency F0. The laser light source is split by beamsplitter 21 to source a first beam, ray 22, to AO1 (acousto-optic modulator 1) 29 and a second beam, ray 14, to MIR5 (mirror 5) and thence to AO2, 49 (acousto-optic modulator 2).

VCO1 45 typically operates at a frequency of 40 MHz and drives AO1 29 at frequency F1. The light source having frequency component F0 passes through AO1 29 and is frequency shifted to contain the frequency component F0+F1.

The light source from AO1, is directed into MIR1 43, a partially transmissive reflector. That portion of the light that enters passive cavity 16 circulates as ray 44, ray 46, ray 48 and ray 50 to form the FCW (clockwise) beam in the cavity.

Referring to FIG. 7, the input path to the first servo loop consists of the path through BS2 21, to AO1 29, to MIR1 43, around the passive out MIR3 39 to DET1 63. DET1 63 provides an electrical signal via signal line 34 to the input of PSD1 (phase sensitive detector 1) 27. PSD1 27 also receives a signal at frequency Fm at its reference input. PSD1 and Low Pass Filter 102 forming LOCK-IN 1 25 to provide a phase related error signal at its output to INTEG1 (integrator 1) 23.

Each error signal is produced as the instantaneous frequency of the laser is swept past the line bandwidth of the cavity. At that moment, the cavity absorbs the FCW light on MIR1 to produce a peak in the signal to the DET1 63 and subsequently to PSD1 27. PSD1 is a phase sensitive detector referenced to the OSC1 source 33 at frequency Fm and is sensitive only to the Fm signal component within ray 40 to DET1.

VCO2 51 typically operates at a variable offset frequency and drives AO2 49 at frequency F2. The light source having frequency component F0, passes through AO2 49 and is frequency shifted to contain frequency component F0+F2.

The light source from AO2 is directed to and predominantly transmitted into partially transmissive reflector 41. That portion of the CCW ray that enters passive cavity 16 circulates as ray 48, ray 46, ray 44 and ray 50 to form the FCCW (counterclockwise) beam in the cavity.

Referring to FIG. 7, the input path to the second servo loop consists of the path through BS2 21, to AO2 49, to MIR4 41, around the passive cavity out MIR3 39 to DET2 31. DET2 31 provides an electrical signal via signal line 64 to the input of PSD2 (phase sensitive detector 2) 61 and Low Pass Filter 112 forming LOCKIN 2 36. PSD2 61 also receives a signal at frequency Fm at its reference input. LOCKIN 2 provides a phase related error signal at its output to INTEG2 (integrator 2) 65.

Each error signal is produced as the instantaneous frequency of the laser is swept past the line bandwidth of the cavity. At that moment, the cavity absorbs the FCCW light on MIR4 to produce a peak in the signal to the DET2 31 and subsequently to PSD2 61. PSD2 is a phase sensitive detector referenced to the OSC1 source at frequency Fm and is sensitive only to the Fm signal component within ray 32 to DET2. LOCKIN 2 provides a polarized error signal via signal line 56 to the input of integrator INTEG2 65.

Therefore, two identical servo loops are used to control the CW and CCW beams onto each of their respective cavity resonances. The path length of the second cavity is adjusted by one PZT. PZT2 35 has both a fine and coarse control to compensate for the thermal and mechanical drifts in the second cavity. The error signals from INTEG1 and INTEG2 are summed together by adder 76 and this sum integrated by INTEG3 and amplified by AMP3, 82 to drive PZT2, 35. This sum technique doubles the dynamic range of the VCO's taken together and keeps the CW and CCW resonances symmetric about the nonrotating resonant cavity frequency. The coarse DC control signal, which is used to bring the second cavity into resonance with the first cavity, is added through Adder 57 along with the AC signal from OSC1 to the rest of the path length servo signal from the two VCO loops and applied to AMP 3 82. Thus, all the path control signals are applied to PZT2.

PHASE SENSITIVE DETECTION STABILIZATION TECHNIQUE

Figure 11A:
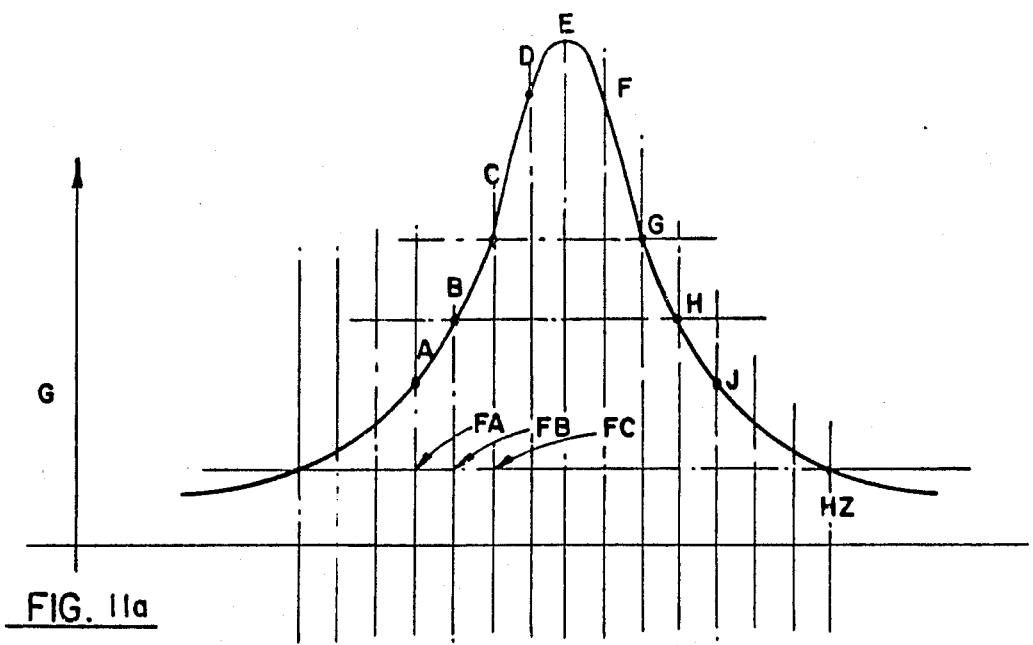
FIG. 11a is a waveform characterizing the signal response from a detector sensing light from an optical passive cavity as frequency is increased from below resonance to a frequency above resonance.

The principle of synchronous demodulation is explained by referring to FIG. 11a which shows the output response curve for a tuned system such as an optical resonator. The output response curve of FIG. 11a is meant to be similar in character to the response curve of FIG. 12a where the center frequency of an injected HeNe laser is $4.7 \times 10^{+14}$ Hz.

Figure 11B:
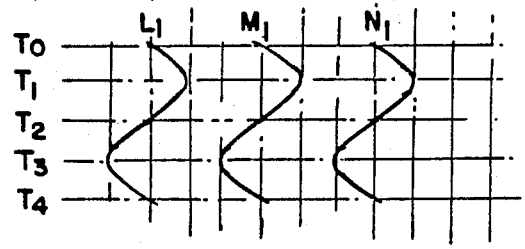
FIG. 11b shows three sinusoidal waveforms depicting identical frequency modulation ranges.
Figure 11C:
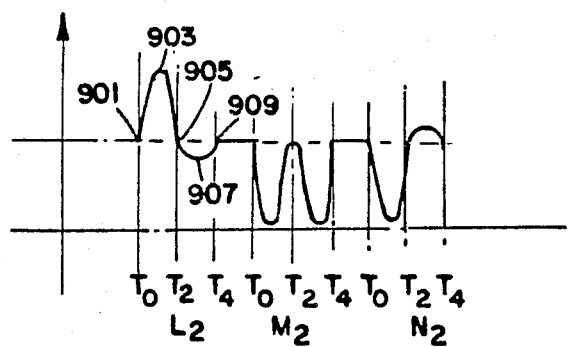
FIG. 11c shows three waveforms from detector diodes sensing light from the cavity of FIG. 11a as a frequency is modulated in ranges characterized by the waveforms of FIG. 11b.

FIG. 11b shows waveforms L1, M1 and N1 as they vary with increasing time from T0 to T4. These waveforms are meant to have amplitudes which when projected onto the horizontal axis of FIG. 11a, characterize the shift in frequency, or modulating range, of single frequency light being sourced to the cavity 16 via mirror ports 43 and 41.

At T0, waveform L1 provides light to the cavity at a frequency of FB. At frequency FB, the signal from the detector has an amplitude at 901 as shown in FIG. 11b. As time increases to T1, voltage L1 shifts or modulates the light source up in frequency to frequency FC at which point, the detector provides an output signal with amplitude peak 903 as shown in FIG. 11b. At T2, L1 returns the light source to frequency FB. At T2, the detector output returns to the amplitude 905. At time T3, modulation voltage L1 drives to FA and the detector output drops to a negative peak 907 as shown in FIG. 11b. At T4, L1 returns to FB with the detector again providing an amplitude at 909.

FIG. 9c shows the detector outputs amplitude referenced to zero volts by use of a dc blocking or decoupling circuit and synchronized with frequencies FA, FB and FC. The mixer receives a reference square wave signal synchronized to the waveforms of FIG. 9b. During the interval T0 to T2, the mixer multiplies the detector output times a factor of +1. During interval T2 to T4, the mixer multiplies the detector output by −1.

Figure 11D:
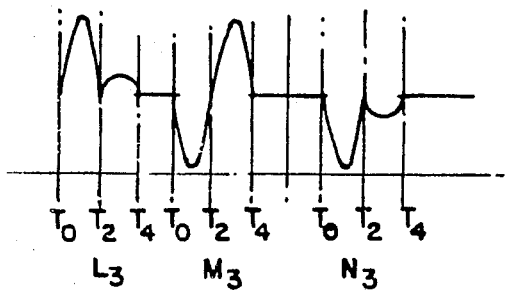
FIG. 11d shows the waveforms from a synchronous mixer receiving the signal waveforms of FIG. 11c.

FIG. 11d provides a characterization of the output of the mixer (27, 61) fed to the low-pass filter in synchronization with T0 through T4. Due to the location of the modulation range associated with waveform L1, the mixer provides an output having two positive regions as shown by waveform L3. The output of the low pass filter would be a average positive dc voltage.

A similar explanation can be made to show that the modulation range of M1 results in the detector output of M2 and the mixer output of M3, and that the modulation range of N1 results in the detector output of N2 and the mixer output of N3.

The low-pass filter excepts the signal of L3 to produce a net positive output, the signal of M3 to produce a zero output and the signal of N3 to produce a net negative output.

The signals of L3, M3 and N3 are integrated by the integrator (23, 65) to provide an error voltage to the respective PZT to shift the frequency of the laser.

The respective DC AMP (19, 53) is driven by the integrator to apply a signal to the VCO (45, 51) to move the frequency of the respective laser in a direction to increase the response of the signal from the second resonator cavity. As the signal from the DC AMP (19, 53) reaches a value sufficient to peak the tuning of the resonator at frequency E, the signal out of the low-pass filter goes to zero and the output of the integrator stops changing leaving the frequency of the affected laser unchanged. A change in the body rate or a change due to induced drift moves the laser off resonance; however the servo responds by shifting the timing voltage to the PZT to re-establish resonance. The bandwidth of the low-pass filter and the frequency modulating the PZT2 limits the dynamic response of the system.

Referring to FIGS. 7, 8, 9 and 10, the LOCK-IN AMPLIFIER 25, 36 functions to mix a dither signal, such as Fm, typically near 1 kHz with a DETECTOR output signal that contains information at the respective Fm dither signal frequency. Using a synchronous demodulation or phase sensitive detection technique, control information is obtained in high noise environments. Lock-in amplifiers of this type are sensitive to the phase relationship between the input information signal and the reference or dither signal of the lock-in amplifier. An in-phase information signal will provide an output response of one polarity and an 180° out-of-phase relationship will result in an output signal of an opposite polarity. A typical LOCK-IN AMPLIFIER suitable for laboratory use is the PRINCETON APPLIED RESEARCH Model 124A manufactured at Princeton, N.J. Amplifiers of this type are typically high Q DC amplifiers that provide a gain of several thousand at the reference or dither frequency and have virtually no gain at other frequencies above or below the reference frequency. For an information signal of a fixed level at the reference frequency, the amplifier typically provides a fixed DC level response at its output.

Cavity and AO Servo Operation

The acousto-optic device is an essential element in the output servo loop. Clockwise light is detected and phase sensitive demodulated to produce a DC error signal comparable to that in FIG. 11b resulting from the frequency modulation stabilization technique. This DC signal is the servo error signal which is integrated and then amplified and fed into a voltage controlled oscillator VCO1 45 or VCO2 51. The VCO1, VCO2 output frequency is used to change the frequency that AO1, AO2 shifts the CW or CCW beam such that the CW or CCW beam is brought into the cavity's resonance, respectively.

The CCW light is detected and phase sensitive demodulated in its corresponding servo loop. PSD2 provides the demodulated CCW error signal on signal line 56 to the input of INTEG2 65 where it is integrated and amplified and fed into a voltage controlled oscillator VCO2 51. The VCO2 output frequency is used to change the frequency that AO2 shifts the CCW beam such that the frequency of the CCW beam is brought into the cavity's resonance. The CW light is detected and phase sensitive demodulated in its corresponding servo loop. PSD1 provides the demodulated CW error signal on signal line 28 to the input of INTEG1 23 where it is integrated and amplified and fed into VCO1 45. The VCO1 output frequency is used to change the frequency that AO1 shifts the CW beam such that the frequency of the CW beam is brought into the cavity's resonance. Therefore, two identical servos are used in the AO, VCO portions of each CW and CCW loop. The input rotation rate to the Phase Locked PRLG sensitive axis is related to the VCO's frequency and is the frequency difference of the frequencies supplied to AO1 and AO2. This frequency F1-F2 difference is counted using counter 71 to form a digital output signal which is scaled to provide a digital representation of the rotation rate about the sensitive axis.

A FIRST ADDER adds the first and second control signals to provide a passive cavity path length difference servo signal An INTEGRATOR integrates the passive cavity path length difference servo signal to provide an integrated passive cavity difference servo signal. A SECOND ADDER then adds the integrated passive cavity difference signal to the reference signal (Fm) to provide the passive cavity path length servo signal to the passive cavity path length adjusting means. The cavity servo constantly adjusts the passive cavity path length servo signal to keep the passive cavity at peak resonance a frequency substantially mid-range between the propagating (FCW) and the counterpropagating beams (FCCW).

An OUTPUT COUNTER means 71 measures and outputs the frequency difference between the first variable offset frequency (F1) and said second variable offset frequency (F2). The measured frequency difference represents the difference in frequency due to an input gyro body rate about the passive ring laser gyro sensitive axis.

Acousto-Optics

The two AO devices are each typically made up of a piezoelectric transducer attached to a crystal. The AO device is fabricated from a piezoelectric crystal material such as quartz, $TeO_2$ (Telurium Dioxide) or $PbMoO_4$ (Lead Molybdate). In the preferred embodiment, the AO1 transducer driven at F1, establishes an acoustic wave at frequency F1 in the crystal. Associated with the acoustic wave is a varying index of refraction due to the compressions and rarefactions of atomic density in the crystal. Incoming light diffracts off this induced grating giving rise to many orders of diffracted beams. The zeroth order beam is at the frequency of the single frequency light, Fo. The first order beam has the frequency (Fo)+F1 where F1 is the frequency of the acoustic wave. Here the input beam is assumed to be Fo.

The output from the AO device has the discrete frequencies (Fo)+nF2 where n=0,1,2 ... each separated in space by an angle proportioned to n. Thus, we see that by shifting the AO F2 wave frequency by 1 Hz, we can add 1 Hz to the frequency of the first order beam exiting the AO2 device. Therefore, the AO's operate as frequency shifters in our application. (See e.g., *Optical Waves in Crystals*, A. Yariv & P. Yeh (John Wiley & Sons)

Common Mode

Two acousto-optic devices are used so each beam encounters similar phase shifts. AO2, driven by the VCO2, shifts the CCW light up in frequency by F2 plus or minus a frequency related to the input rotation rates; AO1 in the CW beam path driven by VCO1 shifts the CW beam up in frequency by F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A passive ring resonator gyroscope comprising:
   a fixed frequency reference signal generator to provide a reference signal at a fixed reference frequency;
   a single piece body having laser and passive resonator cavities, said passive resonator cavity having a closed optical path length;
   a laser means using said laser resonator cavity for providing a single frequency light from a transmitting aperture;
   said passive resonator cavity being a passive high Q evacuated cavity having a path length adjusting means responsive to a passive cavity path length servo signal for adjusting said closed optical path length;
   means responsive to said single frequency light source for coupling a portion of said single frequency light into said passive resonator cavity to form a propagating light beam (FCW) within said passive resonator cavity, and a counterpropagating light beam (FCCW) within said passive resonator cavity;
   a detector and cavity servo means responsive to said reference signal and to samples of said propagating and counterpropagating light beams for providing a first and second control signal;
   VCD means responsive to said first and second control signals for maintaining said propagating light beam (FCW) and said counterpropagating light beam (FCCW) in said passive resonator at peak resonance;
   first adder and integrator means responsive to said first and second control signals for providing said passive cavity path length servo signal to said path length adjusting means for constantly adjusting said passive cavity path length servo signal to keep said passive cavity at peak resonance at a frequency substantially mid-range between said propagating (FCW) and said counterpropagating beams (FCCW);
   output counter means for measuring and outputting a frequency difference between said propagating and counterpropagating beams, the measured frequency difference representing the difference in frequency due to an input gyro body rate about said gyro sensitive axis.

2. A balanced dual servo passive ring resonator gyroscope having enhanced stability and sensitivity comprising:
   a fixed frequency reference signal generator to provide a reference signal at a fixed reference frequency (FM);
   a single piece body having laser and passive resonator cavities;
   a laser means having a power source, using said laser resonator cavity containing a lasing medium, said laser means having a laser cavity servo path length adjusting means (PZT1) responsive to a laser control signal from a laser servo for providing a single frequency light (F0) having a center frequency from a transmitting aperture;
   said passive resonator cavity being a passive high Q evacuated cavity having a closed optical path in a plane and a path length adjusting means responsive to said reference signal for modulating the optical path length of said passive resonator cavity of reference signal frequency, said path length adjusting means being responsive to a passive cavity path length servo signal for adjusting said closed optical path length, said passive ring resonator gyroscope having a sensitive axis substantially normal to the plane of said passive resonator cavity closed optical path;

means responsive to said singly frequency (F0) light for slitting said single frequency light into respective first and second single frequency rays;

first voltage controlled oscillator means responsive to said first single frequency ray and to a first control signal for frequency shifting said first single frequency ray center frequency by a first variable offset frequency (F1) to form a propagating light source (FCW), to supply a propagating light ray and for coupling said propagating light ray into said passive resonator cavity to form a propagating light beam (FCW);

second voltage controlled oscillator means responsive to said second single frequency ray and to a second control signal for frequency shifting a second single frequency ray by a second variable offset frequency (F2) in response to said second control signal to form a counterpropagating light source to supply a counterpropagating light ray (CCCW), and for coupling said counterpropagating light ray (FCCW) into said passive resonator cavity to form a counter propagating light beam;

a detector means optically coupled to sample said propagating light beam (FC) to detect a first offset frequency error signal at reference signal frequency (Fm) and to provide a first offset frequency error signal, said detector means also being optically coupled to sample said counterpropagating light beam (FCCW) for detecting a second offset frequency error signal at reference signal frequency (Fm) to provide a second offset frequency error signal;

cavity servo means responsive to said reference signal and to said first and second offset frequency error signals from said detector means for providing:
  a first control signal to said first voltage controlled oscillator means for frequency shifting said first frequency modulated ray by a first variable offset frequency (F1) to maintain said propagating light beam (FCW) in said passive resonator cavity at peak resonance and to provide,
  a second control signal to said second voltage controlled oscillator means for frequency shifting said second frequency modulated ray by a second variable offset frequency (F2) to control and maintain said counterpropagating light beam (FCCW) in said passive resonator cavity at peak resonance;
  a FIRST ADDER means responsive to said first and second control signals for algebraically adding said first and second control signals to provide a passive cavity path length difference servo signal;
  an INTEGRATOR means responsive to said passive cavity path length difference servo signal for providing an integrated passive cavity difference servo signal;
  a SECOND ADDER means for adding said integrated passive cavity difference signal to said reference signal (Fm) to provide said passive cavity path length servo signal to said passive cavity path length adjusting means and for constantly adjusting said passive cavity path length servo signal to keep said passive cavity at peak resonance at a frequency substantially mid-range between said propagating (FCW) and said counterpropagating beams (FCCW);
  means for tuning the cavity to adjust the cavity to be substantially resonant at the frequency of said single frequency light source in the absence of a body rate input;
  output counter means for measuring and outputting the frequency difference between said first variable offset frequency (F1) and said second variable offset frequency (F2), the measured frequency difference representing the difference in frequency due to an input gyro body rate about said gyro sensitive axis.

3. The passive ring resonator gyroscope of claim 1 wherein said laser means further comprises:
  a means for sampling and detecting said single frequency light from said single frequency light source;
  a first piezoelectric transducer (PZT1) having a mirror surface positioned within said integral first cavity to adjust the path length of reflected light within said laser cavity, said PZT1 being responsive to said laser control signal to peak adjust the output intensity of the single frequency light (F0) leaving said laser resonator cavity.

4. The passive ring resonator of claim 3 wherein said means for sampling and detecting said single frequency light source further comprises:
  a beam splitter having a receiving aperture responsive to said single frequency light from said first resonator laser means and an aperture for providing a sample of said single frequency light to a laser detector.

5. The passive ring resonator of claim 2 wherein said first voltage controlled oscillator means further comprises:
  a first voltage controlled oscillator (VCO1) for providing a first variable offset frequency signal (F1), and;
  a first acousto-optic coupler (AO1) responsive to said first single frequency ray and to said first variable offset frequency signal for upshifting the frequency of said first single frequency ray by a frequency equal to the frequency of said first voltage controlled oscillator output signal (F1), and for providing said propagating light ray (FCW) to said passive resonator cavity.

6. The passive ring resonator of claim 5 wherein said second voltage controlled oscillator means further comprises:
  a second voltage controlled oscillator (VCO2) for providing a second variable offset frequency (F2), and;
  a second acousto-optic coupler (AO2) responsive to said second single frequency ray and to said second variable offset frequency signal for upshifting the frequency of said second single frequency ray by a frequency equal to the frequency of said second voltage controlled oscillator output signal and for providing said counterpropagating light ray (FCCW) to said passive resonator cavity.

7. The passive ring resonator of claim 2 wherein said detector means for detecting a first offset frequency error signal and for detecting a second offset frequency error signal further comprises:

first and second detector diodes and respective first and second detector amplifiers, each detector amplifier being electrically coupled to a respective detector diode and both amplifier and diode being biased to provide respective first and second offset frequency error signals;

said first detector diode being coupled to be responsive to a sample of said propagating light beam and to provide a detected first offset frequency error signal; and said second detector diode being coupled to be responsive to a sample of said counterpropagating light beam and to provide a detected second offset frequency error signal, each respective detected offset frequency error signal being amplified by a respective detector amplifier to provide a respective offset frequency error signal.

8. The passive ring resonator of claim 2 wherein said cavity servo means further comprises:

first and second lock-in amplifiers, each lock-in amplifier being responsive to said reference signal (Fm) and to a respective first and second offset frequency error signal, for demodulating, filtering and integrating each respective first and second offset frequency error signal to provide respective first and second filtered and demodulated offset frequency error signals;

a first and second servo integrator;

said first integrator having an input coupled to receive said first filtered and demodulated frequency error signal and an output to provide said first control signal; and said second integrator having an input coupled to receive said second filtered and demodulated offset frequency error signal and an output to provide said second control signal.

9. A passive ring resonator gyroscope comprising:

a fixed frequency reference signal generator to provide a reference signal at a fixed reference frequency (Fm);

a single piece body having laser and passive resonator cavities, said passive resonator cavity having a closed optical path length;

a laser means using said laser resonator cavity for providing a single frequency light (F0) from a transmitting aperture;

said passive resonator cavity being a passive high Q evacuated cavity having a path length adjusting means responsive to said reference signal for adjusting said closed optical path length;

means responsive to said single frequency light source for coupling a propagating light ray into said passive resonator cavity to form a propagating light beam (FCW) within said passive resonator cavity and for coupling a counter propagating light ray (FCCW) into said passive resonator cavity to form said counter propagating light beam within said passive resonator cavity;

a detector;

and cavity servo means responsive to said reference signal and to sample of said propagating and counterpropagating light beams for providing a first and second control signal;

means responsive to said first and second control signals for frequency shifting said propagating and counterpropagating light rays by respective first and second variable offset frequencies (F1), (F2) to maintain FIRST ADDER MEANS responsive to said first and second control signals for algebraically adding said first and second control signals to provide a passive cavity path length difference servo signal;

INTEGRATOR means responsive to said passive cavity path length difference servo signal for providing an integrated passive cavity difference servo signal;

SECOND ADDER means for adding said integrated passive cavity difference signal to said reference signal (Fm) to provided said passive cavity path length servo signal to said passive cavity path length adjusting means and for constantly adjusting said passive cavity path length servo signal to keep said passive cavity at peak resonance at a frequency substantially mid-range between said propagating (FCW) and said counterpropagating beams (FCCW);

means for tuning the said passive resonator cavity to be substantially resonant at the frequency of said single frequency light source in the absence of a body rate input;

OUTPUT COUNTER MEANS for measuring and outputting the frequency difference between said first variable offset frequency (F1) and said second variable offset frequency (F2), the measured frequency difference representing the difference in frequency due to an input gyro body rate about said gyro sensitive axis.

* * * * *